March 26, 1946. P. H. JAMES Re. 22,735

ILLUMINATED DISPLAY CASE

Original Filed Jan. 29, 1944

INVENTOR.
Parker H. James,
By Herbert A. Minturn,
Attorney.

Reissued Mar. 26, 1946

Re. 22,735

UNITED STATES PATENT OFFICE 22,735

ILLUMINATED DISPLAY CASE

Parker H. James, Indianapolis, Ind.

Original No. 2,355,731, dated August 15, 1944, Serial No. 520,174, January 29, 1944. Application for reissue July 18, 1945, Serial No. 605,648

5 Claims. (Cl. 240—6)

This invention relates to means for illuminating a display case of that type wherein there is a top and front glass wall preferably in one integral piece without any upper, forward corner strip. A primary object of the invention is to illuminate the interior of the case in such manner that there will be uniform light distribution throughout the interior of the case without any appreciable shadows being created upon the goods therein to be displayed. A further primary object of the invention is to illuminate the case without having to employ a lamp or other illuminating means along the upper, forward portion of the case as has heretofore been the practice.

In the present form of the invention, the front and top of the case is formed in one continuous piece of glass bent from the vertical or front face around and over to form the top of the case so that visibility of the contents displayed within the case is not interfered with by any glass support pieces or the like. By use of the invention herein set forth, the entire interior of the case is illuminated without any visible point or line source of light, and yet but a single position of the light source is employed whereby the cost of installation and of electric energy is reduced to the minimum.

Figure 1:
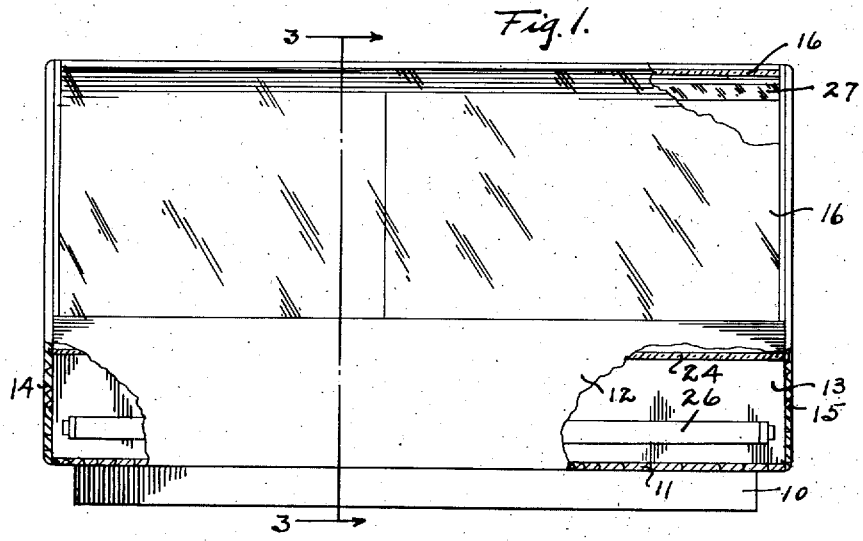
Figure 2:
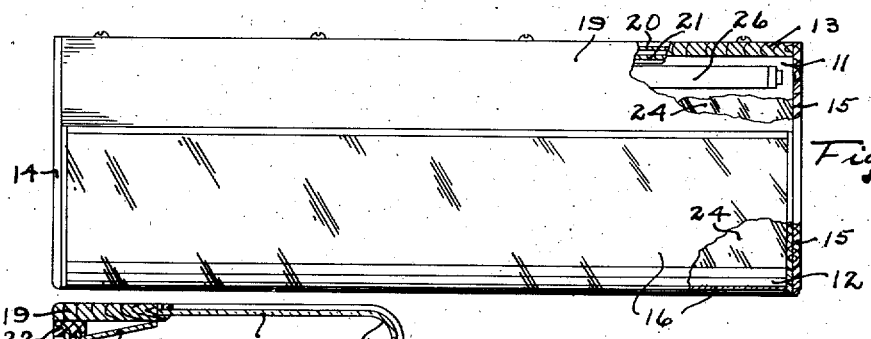

These and other objects and advantages of the invention will become apparent to those versed in the art in the following description of one particular form of the invention as illustrated in the accompanying drawing, in which Fig. 1 is a view in front elevation of a structure embodying the invention;

Fig. 2, a top plan view; and

Figure 3:
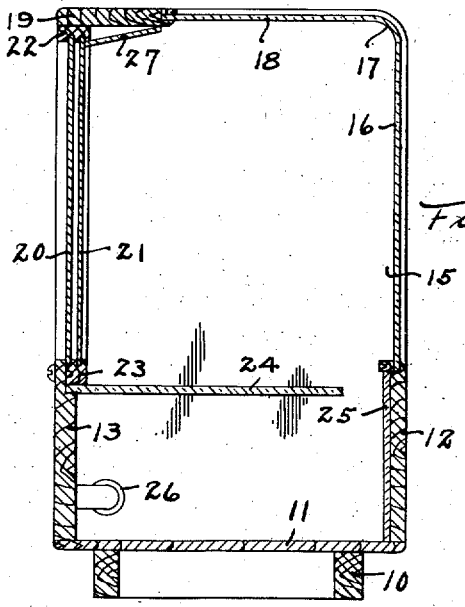

Fig. 3, a view in vertical transverse section on the line 3—3 in Fig. 1.

Like characters of reference indicate like parts throughout the several views in the drawing.

Upon a suitable base 10 is built a display case proper to have a floor 11 with front and back opaque panels 12 and 13 respectively extending vertically therefrom. End walls 14 and 15 extend vertically upwardly from the floor 11 beyond the panels 12 and 13 at least to the desired height of the case.

Between these end walls 14 and 15 is mounted the front and top inclosure formed of the single piece of glass 16 to have its lower end mounted on the top edge of the panel 12 and to extend vertically therefrom to a top curved portion 17, through which portion the glass is bent around rearwardly to continue therefrom in a horizontal top portion 18. The rear edge of this top portion 18 terminates at a slight distance forwardly of the rear side of the case and is supported by the top opaque rail 19 which extends across between and is supported by the end walls 14 and 15. Thus the glass 16 is supported along its lower edge by the panel 12 and along its rear edge by the rail 19, all without any intervening corner strip around the bent portion 17.

The rear of the case is preferably inclosed by any suitable means, such as by the two sliding doors 20 and 21, the top and bottom edge portions of which are suitably guided in slots provided in the molding 22 and 23 carried respectively by the top rail 19 and the rear panel 13. A translucent sub-floor 24 is fixed between the end walls 14 and 16 to be substantially horizontal and in spaced relation above the floor 11, as indicated in Fig. 3. In the present form of the invention, the rear edge of this sub-floor 24 is supported along a shoulder provided on the rear panel 13 and is held thereagainst by means of the molding 23 being positioned across the top side of the floor and against the front face of the panel 13 which is provided to extend above the level of the floor 24. The front edge of the floor 24 is located at a distance behind the panel 12, as indicated in Fig. 3.

The inner face of the front panel 12 is provided with a mirror 25 or reflecting surface preferably over its entire area, but in any event, extending above and below the level of the sub-floor 24, the major portion of the mirror 25 being below that level. Below the central zone of the rear panel 13 and extending longitudinally thereacross is mounted a lamp 26, preferably of the fluorescent type, as indicated by the drawing, to be in tubular form.

Mounted under the top rail 19 is a mirror 27 or reflecting surface positioned to slope downwardly from near the front edge portion of the rail 19, and rearwardly to the molding 22 in the form of the invention herein shown. In other words, this mirror 27 is diagonally positioned across the corner between the top rail 19 and the molding 22.

Light emanating from the lamp 26 may travel upwardly through the translucent floor 24 to be diffused throughout the case thereabove. Forwardly traveling rays from the lamp 26 will strike the substantially vertically disposed mirror 25, and, depending upon the angle of impact thereon, will be reflected in part diagonally against the floor 24 and in part upwardly through the gap between the front edge of the floor 24 and the mirror 25, such reflected rays being directed rearwardly and upwardly rather than toward the front wall of the glass 16. Some of these rays coming through that gap will strike directly upon the surface of the top mirror 27 and be reflected back downwardly and toward the floor 24. The diffused light above the floor 24 will also be tended to be reflected downwardly and toward the floor 24 by the mirror 27.

By this peculiar arrangement of the translucent floor 24 and the two mirrors 25 and 27 disposed as indicated, the entire interior of the case appears to glow with light without any apparent light source, and yet objects placed upon the floor 24 will appear to be well illuminated from all sides and their tops without casting appreciable shadows. In fact, the objects so located on the floor 24 will be extremely attractively displayed and will appear to sit out in space.

The interior faces of the end walls 14 and 15 as well as of the panels 20 and 21 are preferably made to be light reflecting, such as being finished in white. Likewise the top side of the floor 11 and the forward side of the rear panel 13 are finished in white to tend to reflect light rather than absorb it. The floor 24 is preferably made out of glass, either sanded on one side or its body made either entirely or in part of translucent glass rather than clear glass. Obviously the glass wall 16 is transparent, and to the casual observer appears not to exist when the interior of the case is illuminated as above described.

The width of the gap between the forward edge of the sub-floor 24 and the face of the mirror 25 is held to a relatively small dimension. For example, in a case having a sub-floor twenty inches from front to back, and a height of twenty-one inches above the sub-floor 24, this gap will be approximately two inches wide.

While I have herein shown and described my invention in the one particular form, it is obvious that structural variations may be employed without departing from the spirit of the invention and I therefore do not desire to be limited to that precise form beyond the limitations as may be imposed by the following claims.

I claim:

1. In a display case having a continuous transparent front and top inclosure, a floor, and front and rear opaque walls extending from said floor to at least the level of the lower end of said inclosure, the combination of a translucent sub-floor spaced above said floor having a front edge spaced back of said front opaque wall to leave an opening therebetween; a light source below said sub-floor adjacent said rear opaque wall; a light reflecting surface on the inner side of said front opaque wall; and a light reflecting surface in the upper rear portion of said case back of said top inclosure and disposed to reflect light downwardly and forwardly.

2. In a display case having a continuous transparent front and top inclosure, a floor, and front and rear opaque walls extending from said floor to at least the level of the lower end of said inclosure, the combination of a translucent sub-floor spaced above said floor having a front edge spaced back of said front opaque wall to leave an opening therebetween; a light source below said sub-floor adjacent said rear opaque wall; a light reflecting surface on the inner side of said front opaque wall; and a light reflecting surface in the upper rear portion of said case back of said top inclosure and disposed to reflect light downwardly and forwardly; said light source consisting of a tubular fluorescent lamp extending along said rear opaque wall near said floor; and end walls, between which said inclosure, opaque floors, and sub-floor extend; the inner sides of said end walls and said rear opaque wall being light reflecting.

3. In a display case having a continuous transparent front and top inclosure, a floor, and front and rear opaque walls extending from said floor to at least the level of the lower end of said inclosure, the combination of a translucent sub-floor spaced above said floor having a front edge spaced back of said front opaque wall to leave an opening therebetween; a light source below said sub-floor adjacent said rear opaque wall; a light reflecting surface on the inner side of said front opaque wall; and a light reflecting surface in the upper rear portion of said case back of said top inclosure and disposed to reflect light downwardly and forwardly; said front opaque wall reflecting surface extending above said sub-floor and terminating at least substantially at the lower level of said front inclosure.

4. In a display case having a continuous transparent front and top inclosure, a floor, and front and rear opaque walls extending from said floor to at least the level of the lower end of said inclosure, the combination of a translucent sub-floor spaced above said floor having a front edge spaced back of said front opaque wall to leave an opening therebetween; a light source below said sub-floor adjacent said rear opaque wall; a light reflecting surface on the inner side of said front opaque wall; and a light reflecting surface in the upper rear portion of said case back of said top inclosure and disposed to reflect light downwardly and forwardly; said light source consisting of a tubular fluorescent lamp extending along said rear opaque wall near said floor; and end walls, between which said inclosure, opaque floors, and sub-floor extend; the inner sides of said end walls and said rear opaque wall being light reflecting; and a light reflecting surface across the rear of said case between said sub-floor and said top disposed reflecting surface.

5. A display case comprising a floor; front and rear opaque panels extending upwardly therefrom; end walls across said panels extending from said floor and above the panels; a transparent front wall extending from the top of said front panel and curving around and rearwardly in a continuous manner toward the tops of said end walls to form a top to said case and terminate by a rear edge forwardly of a vertical plane including said rear panel; a top panel receiving said rear edge and filling in the space between it and said plane; a rear case inclosure between said rear and top panels; a sub-floor of translucent material at substantially the level of the top edges of said front and rear panels, said sub-floor terminating by a front edge back of said front panel to leave a slot-like opening therebetween; a light source distributed under and longitudinally across said sub-floor toward said rear panel and spaced between said floor and said sub-floor; a light reflecting surface on said front panel continuing above and below the level of said sub-floor; and a light reflecting member mounted under said top panel and sloping rearwardly and downwardly in respect to said case top.

PARKER H. JAMES.